Dec. 10, 1968  H. W. FERCHLAND  3,415,089
HYDROSTATIC CONTINUOUS FORMING MILL
Filed Dec. 12, 1966  2 Sheets-Sheet 1
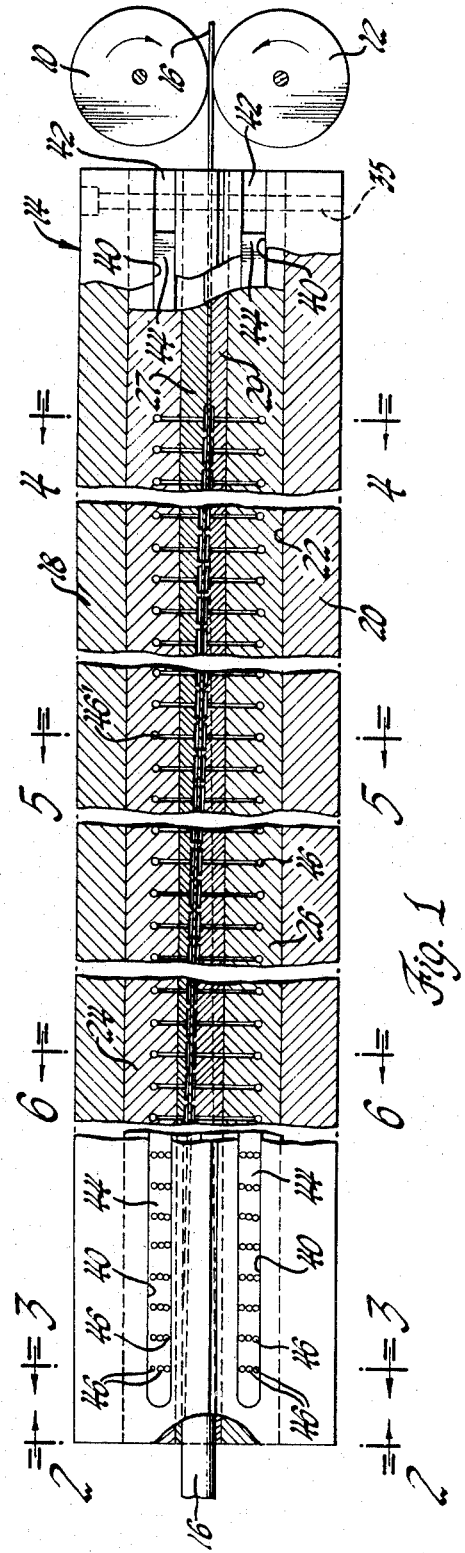
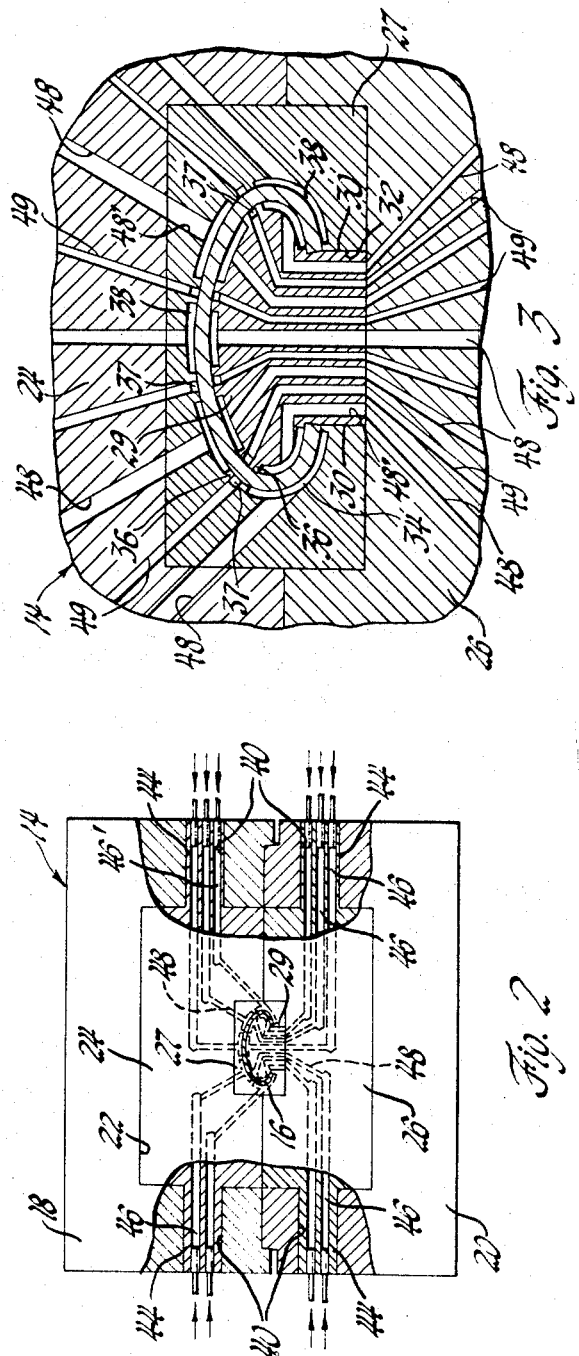
INVENTOR.
Harold W. Ferchland
BY
George E. Johnson
ATTORNEY INVENTOR.
Harold W. Ferchland
BY
George C. Johnson
ATTORNEY

3,415,089
HYDROSTATIC CONTINUOUS FORMING MILL
Harold W. Ferchland, Troy, Mich., assignor to General Motors Corporation, Detroit, Mich., a corporation of Delaware
Filed Dec. 12, 1966, Ser. No. 600,922
10 Claims. (Cl. 72—60)

ABSTRACT OF THE DISCLOSURE

This invention relates to forming mills and more particularly to mills for progressively transforming the contours of continuously fed material such as elongated sheets of metal or plastic by the application of fluid pressure thereto.

Background of the invention

It has been found desirable to transform the cross-section of elongated work pieces of sheet materials susceptible to molding without fracture to obtain products of uniform and required cross-section and to do so continuously in the effecting of high volume production such as needed, for example, in making ornamental strip trim for automobile bodies. Apparatus or a forming mill has now been developed in accordance with the present invention which not only satisfies the requirements of high volume production because of its continuous mode of operation but which is characterized by a minimum or no wear on the mill with slight or no possibility of marring the surfaces of the work as it transforms the latter.

Hydrostatic bearings for shafts have been used heretofore and are described in a series of articles beginning in the June 1963 issue of Machine Design and written by Harry C. Rippel. Principles as to bearings set forth in these articles are pertinent in the application of the present invention.

Summary of the invention

The invention pertains to a mill having a die arrangement defining an elongated work passage of a contour gradually changing along its legth combined with means for feeding a work piece of sheet material through the passage and means for continually applying hydrostatic or fluid pressure to the sheet material causing the latter progressively to change its shape or contour in accordance with the contours of surfaces or fluid pressure restricting tables of facing sides of the work passage.

Description of the drawings

FIGURE 1 is an elevation and schematic view, with a portion in section, showing a mill constructed in accordance with the present invention and forming one embodiment thereof;

FIGURE 2 is an end view of the mill shown in FIGURE 1 with parts in section as viewed in the direction of the arrows 2—2 in FIGURE 1, all fluid discharge ducts being omitted for optimum clarity;

FIGURE 3 is an enlarged sectional view as looking in the direction of the arows 3—3 in FIGURE 1 and showing the cross-sectional shape and contour of the sheet metal product immediately prior to discharge from the mill;

Description of the preferred embodiment

Figure 4:
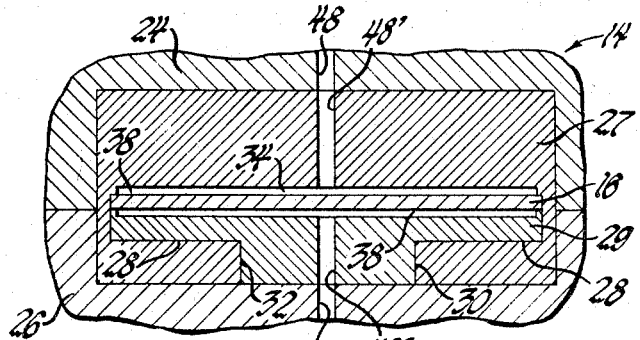
FIGURE 4 is an enlarged sectional view looking in the direction of the arrows 4—4 in FIGURE 1 and showing the work in its initial flat condition.

FIGURE 1 shows two cooperating fed rolls 10 and 12 mounted at one end of the mill generally indicated at 14 and capable to feed a continuous length of strip material 16 through the mill. The mill 14 comprises a main support casing 18 and a main lower support casing 20. Registering channels are cut in the casing 18 and 20 to define an elongated and generally rectangular cross-section recess 22 for tightly retraining or positioning two die holders 24 and 26.

Figure 5:
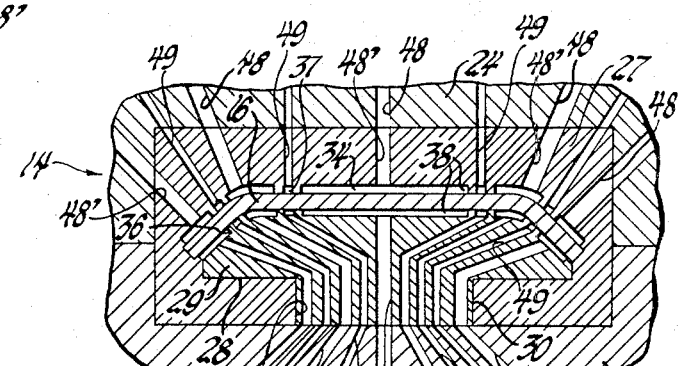
FIGURE 5 is a sectional view looking in the direction of the arrows 5—5 in FIGURE 1 and showing the work in an intermediate condition of formation.
Figure 6:
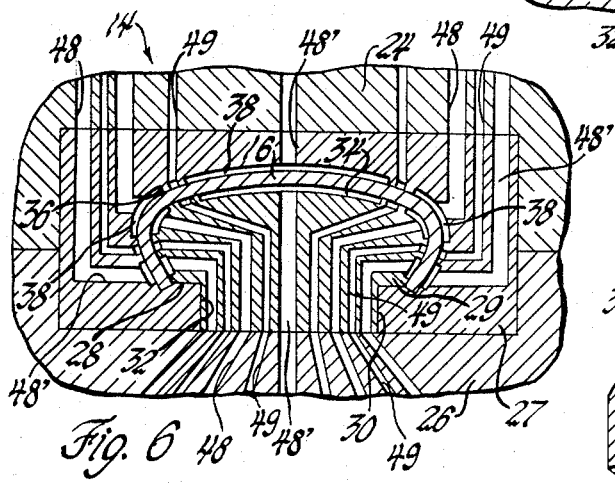
FIGURE 6 is a sectional view looking in the direction of the arrows 6—6 in FIGURE 1 and showing a later formed but not finalized section of the work.
Figure 7:
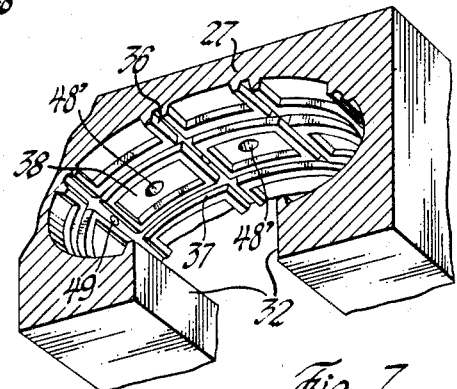
FIGURE 7 is a perspective view of a section of an exterior die taken from that portion of the die shown in FIGURE 3.
Figure 8:
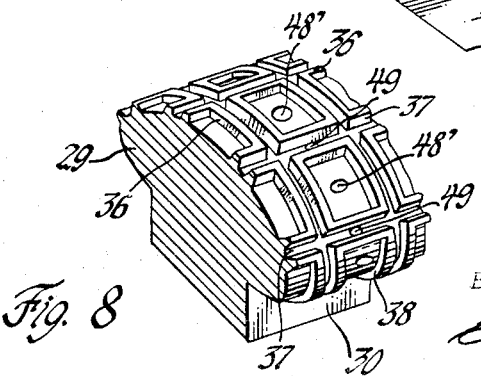
FIGURE 8 is a perspective view of a section of an interior die as shown in FIGURE 3.

The die holders 24 and 26, in turn, are recessed to retain an exterior die 27 and an interior die 29 having engaging surfaces forming an interface 28 (FIGURES 4, 5, and 6) which is substantially horizontal or parallel with the work piece sheet material 16 at the work inlet end of the mill and in the plane of the bite of the feed rolls 10 and 12. In the particular design illustrated, this interface 28 is shown at each side of the mill center line to be of a given width in FIGURE 4 which gradually reduces in the direction of work passage and as seen in FIGURES 5 and 6 until the interface is non-existent as in FIGURE 3. A tongue 30 of uniform breadth and height extends the length of the interior die 29 and is integral therewith. A slot 32 is formed along the underside of the exterior die 27 (FIGURES 4, 5, 6, and 3) tightly to receive the tongue 30. The die 27 is herein termed the exterior die and the die 29 is called the interior die as they cooperate as exterior and interior members with relation to the work 16 to restrain the latter in a gradually or progressively changing contour space 34 defined between them as will further appear.

A series of large bolts are utilized to hold the casings 18 and 20 together so that the mill 14 is an independent unit. It could, however, be retained in a camping arrangement. The bolts are not shown in the drawings but a bore 35 is shown for receiving one of the bolts.

The continuities of the facing surfaces of the dies 27 and 29 defining the work space 34 are interrupted by sills or lands 36 forming discharge passages 37 between hydraulic pressure "pads" or restricting tables 38. A pressure restricting table 38 is represented in FIGURES 3 to 8 as a pressurized space occupied by a recess and two or four confining sills 36 of a die 27 or 29 and the work piece 16 or between two or four discharge passages 37 and the latter. In FIGURE 4, each restricting table extends the full width of the space 34 as determined by two sills 36. In each of FIGURES 5, 6, and 7 there are five restricting tables 38 shown as extending in series across the top as well as the bottom of the space 34. The number of tables transverse to the work space or passage 34 is varied along the length of the latter as is appropriate to gain a specific result but in all cases it is advantageous to give a balanced result by arranging each set of two fluid pressure restricting tables 38 at opposite sides of the work passages 34 in registry. This is not essential for every set.

Two oppositely disposed slots 40 (FIGURES 1 and 2) are formed in each main casing 18 and 20 and each of these slots is open at one end as at 42 (FIGURE 1) for the reception of a tongue 44 integral with and extending from a die holder 24 or 26. Each tongue 44 is bored to form horizontal fluid inlet ducts 46 extending into a die holder 24 or 26. Additional inlet bores 48 are made in the die holders 24 and 26 whereby pressure fluid flow connections are made with cooperative inlet bores 48' made in each of the dies 27 and 29.

The arrangement of the inlet bores is such that each pressure restricting table 38 above and below the work passage or space 34 is provided with an inlet bore.

The sills 36 of each restricting table 38 at least partially surround that table and the discharge passages 37 are provided with bores 49 in the dies 27 and 29 whereby oil may flow from between the work 16 and the tables 38 to a sump for recirculation by a pump to the mill.

In operation of the mill 14, the feed rolls 10 and 12 are rotated to feed the strip 16 to the left as viewed in FIGURE 1. Pressure fluid is introduced to each of the restricting tables 38 by way of the bores 46 provided. As the work or strip 16 proceeds, the hydraulic pressure causes the contour of the strip material progressively to conform with the facing restricting tables of the dies 27 and 29 until the C form of FIGURE 3 is produced and ultimately discharged at the left hand end of the mill as seen in cross-section in FIGURES 1 and 2.

The application of the fluid pressure provides support to both sides of the work as the latter is advanced through the mill. The tables 38 apply pressure uniformly as the material passes through and undergoes a gradual change to the desired shape. The rollers 10 and 12 push the work but the latter could be pulled or both pushed and pulled. The force of the oil pressure is at right angles to the travel path of the work and each table is curved in a pattern so that all the tables ultimately effect the desired work contour. The fluid pressure at the various restricting tables 38 may be varied to gain a particular desired result.

In forming conventional bright metal trim for an automobile body as an example of the mill operation, a total oil flow through the mill successfully to maintain pressure would be 1.694 gallons per minute. This is based on the use of an SAE 30 oil as the pressure fluid and a 0.0005 inch clearance on either side of the work, i.e. between each sill or land 36 and the work 16. If the clearance is doubled, the same forming effect may be had making the oil flow at 13.5 gallons per minute. From this, it may be seen that performance and fluid flow may be changed by altering the fluid viscosity, clearances or flow pertaining to each restricting table 38, and the fluid supply pressure.

The sills 36 act similarly to labyrinth seals conventionally used around rotary shafts. In case a land area of a sill 36 adjacent to a given table 38 turns out to be too far from the work, the error of clearance may be overcome by enlarging or restricting the inlet 48 leading to that particular table. Fluid applied around the work 16 at each end of the mill may be air supplied at 5 or 10 pounds over atmospheric pressure to constitute an air seal. Such air seals are common and are not disclosed herein as they are not part of the present invention. Customarily, an air seal is a groove in a support and surrounding a shaft, a "runner," or a piece of work so that a band of pressurized air surrounds the shaft, etc. One side of such an air seal could retain the oil in the present mill 14 by virtue of the air pressure acting inwardly against the oil. The air leaking from that seal would spill into the room.

Although not specifically described herein, restrictors are essential in the inlet lines leading to the restricting tables 38. Such a restrictor may be in the form of a capillary tube, an orifice or a pressure compensated flow-control valve. A restrictor is required for each inlet and permits multiple restricting tables 38 to operate hydrostatically from a single fluid supply pump. The restrictors limit the flow to each table—a principle well known in the hydrostatic art. A pressure drop exists across a sill and from a corresponding recess in a table to the discharge groove around that table. A table requiring the least lift pressure will lift first. As this pressure is not sufficient to lift a second table, all the fluid flow will pass through the first table except for the presence of the restrictors. The pump pressure is allowed to rise to a value necessary to lift all the tables.

The fluid pressure lines leading to the mill 14 together with the fluid discharge lines leading from the passages 49 of the mill are not disclosed as they involve mere matters of piping and manifolding except for the restrictors in the pressure lines heretofore mentioned and these are selected to suit the requirements of the restricting tables in accordance with well-known procedures as outlined in the articles by H. C. Rippel heretofore mentioned. It should also be appreciated that the fluid lines could be set up to supply a heated fluid around the work 16 at the stock entry end of the mill and to supply chilled fluid at the stock discharge end. This procedure is particularly advantageous when plastic material is used for the stock. Heat assists in the progressive contouring of the stock and chilling sets the contour of the work at discharge.

Some advantages are:

(1) Uniform pressure prevents reduction in material thickness in localized areas, if not desired, and pressures may be varied to gain that reduction in some instances if desired;

(2) The fluid film lubricates work passage;

(3) Prepolished or preplated metals or plastics may be formed as work surfaces are not marred;

(4) The mill forms or dies are subjected to no or substantially no wear as the work is maintained clear therefrom by the fluid film.

I claim:

1. A mill for forming sheet material, said mill comprising a die arrangement defining an elongated work passage of a contour gradually changing along its length, facing surfaces of said die arrangement presenting multiple fluid pressure restricting tables, fluid discharge passages separating the tables of each of said facing surfaces, means for directly supplying pressure fluid to each of said tables, and means for feeding an elongated sheet of material along said work passage whereby said restricting tables may be made effective in the presence of said sheet material to maintain fluid pressures against the latter progressively to change the contour of said material as determined by said facing surfaces.

2. A mill as set forth in claim 1, the said die arrangement comprising an elongated exterior die and an elongated interior die, the said interior die being retained at least partially within said exterior die to define said work passage between said facing surfaces of said dies, and the said restricting tables limiting the cross section of said work passage to the thickness of said sheet material plus work clearance with said restricting tables.

3. A mill as set forth in claim 2, the said cross section of said work passage progressively changing along at least a portion of the length of said mill from a flat to a curved contour.

4. A mill as set forth in claim 2, the said cross section of said work passage progressively changing from a flat to a symmetrical form.

5. A mill as set forth in claim 1, the said restricting tables constituting sills separately defining said fluid pressure restricting tables on each of said facing surfaces, and said sills each being adapted to cooperate with said sheet material in defining a film clearance for said pressure fluid flow from one of said restricting tables to one of said adjacent fluid discharge passages.

6. A mill as set forth in claim 1, the number of said fluid pressure restricting tables extending transverse to the elongated work passage varying along at least a portion of the length of said work passage.

7. A mill as set forth in claim 1, said sheet material feeding means being located at least at one end of said elongated work passage.

8. A mill as set forth in claim 1, said sheet material feeding means constituting cooperative rollers having a bite in alignment with one end of said work passage.

9. A mill as set forth in claim 1, each of said fluid pressure restricting tables comprising a die defining a recess connected to said pressure fluid supplying means and at least two sills bounding said recess.

10. A mill as set forth in claim 1, two of said fluid pressure restricting tables at opposite sides of said elongated work passage being in registry.

References Cited
UNITED STATES PATENTS

| | | | |
|---|---|---|---|
| 2,726,973 | 12/1955 | Corral | 72—54 |
| 2,977,630 | 4/1961 | Bazler | 18—4 |
| 3,185,747 | 5/1965 | Boggs | 18—4 |
| 3,328,998 | 7/1967 | Sabroff | 72—60 |
| 3,358,488 | 12/1967 | Fuchs | 72—62 |

CHARLES W. LANHAM, *Primary Examiner.*

K. C. DECKER, *Assistant Examiner.*

U.S. Cl. X.R.

18—4; 72—176, 274